Patented Aug. 15, 1939

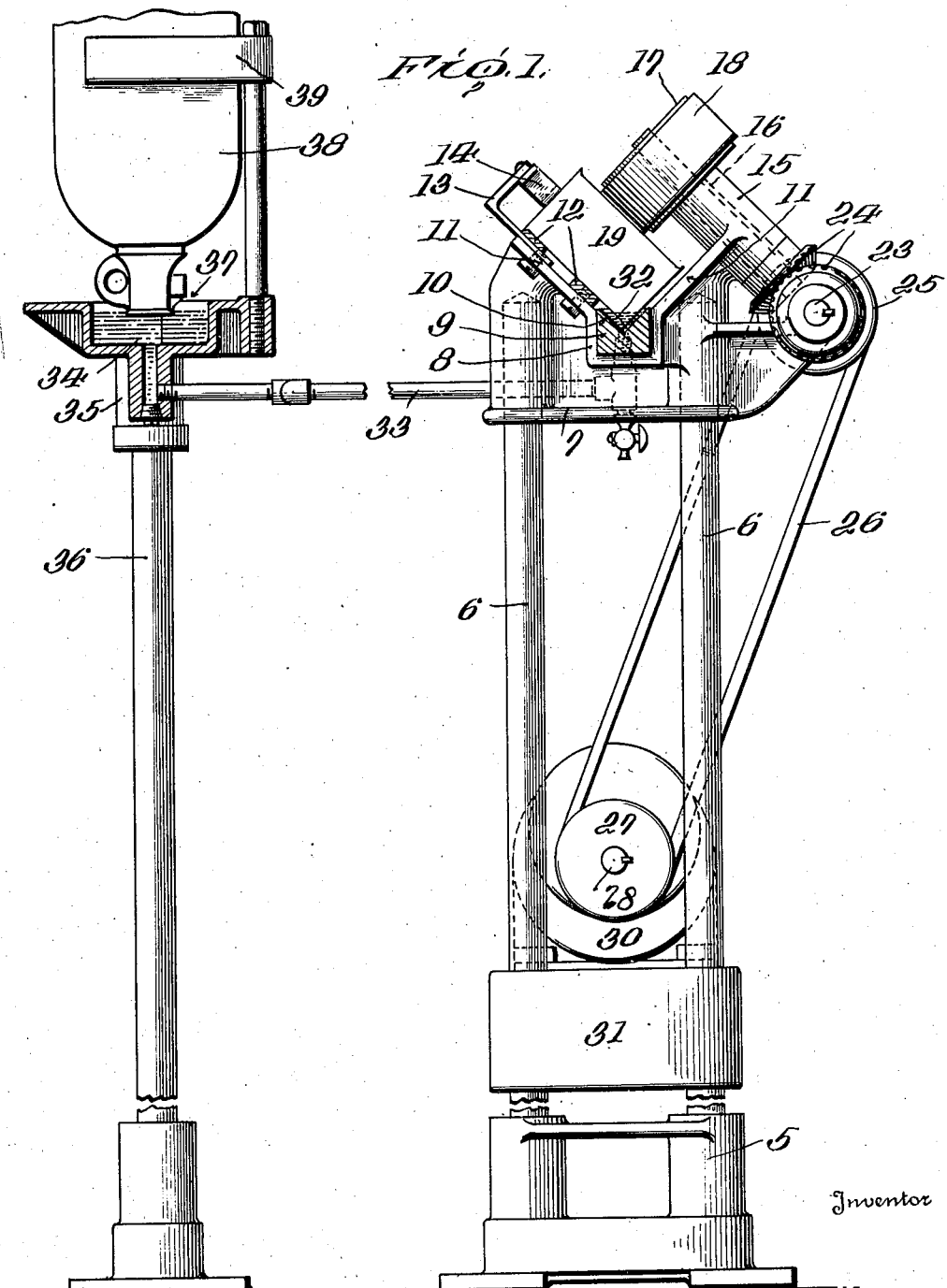

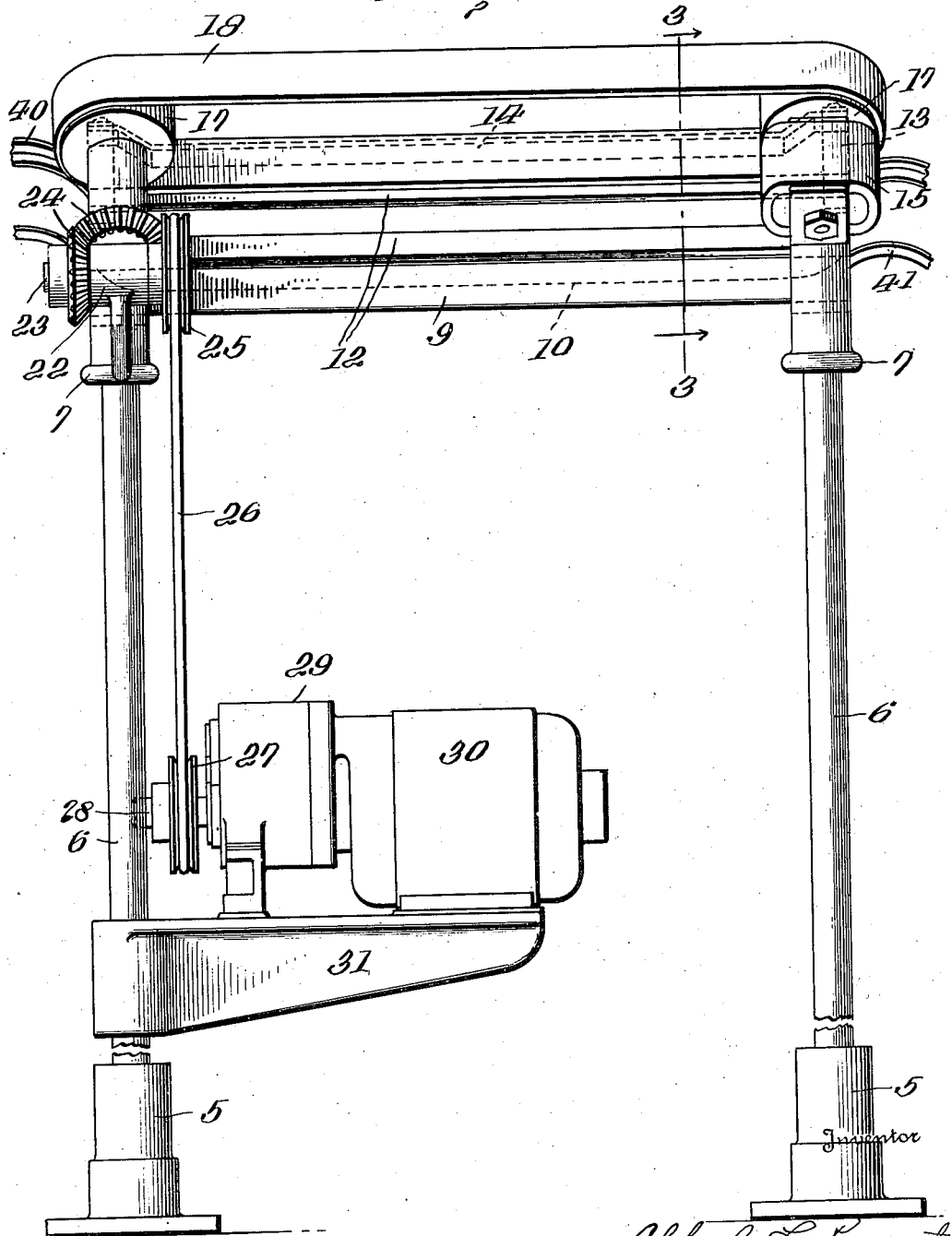

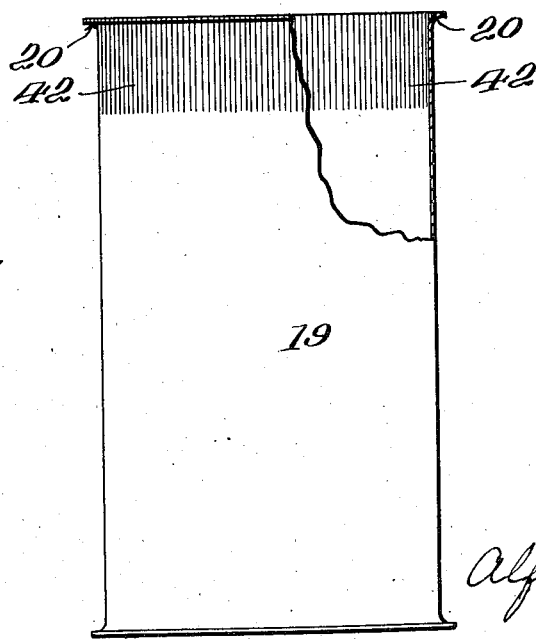

2,169,805

UNITED STATES PATENT OFFICE 2,169,805

APPARATUS FOR COATING CAN BODIES

Alfred L. Kronquest, Syracuse, N. Y., assignor to Continental Can Company, Inc., New York, N. Y., a corporation of New York Application November 10, 1937, Serial No. 173,937

2 Claims. (Cl. 91—46)

The invention relates generally to means for coating can bodies and has for an object to provide a novel apparatus for coating open end portions only of said can bodies.

It is customary to interiorly coat metallic containers adapted to receive certain products, so that direct contact between said products and the metal of the containers is avoided. This is particularly true in the canning of beer, since it has been found that the slightest exposure of the tin forming the outer surface of the metal causes a chemical reaction upon the beer sufficient to change its appearance, making it cloudy and unmarketable.

The protective coating has been applied in various ways, as by dipping, flushing, or flooding the inside, outside, or both inside and outside of the can bodies in the coating solution, usually lacquer or enamel, and this application is followed by a draining of surplus solution from the coated can bodies, the latter being accomplished by disposing the can bodies in a vertical or near vertical position. An example of this draining of surplus solution, following an application by the dipping method, is to be found in the application for Letters Patent filed by Alfred L. Kronquest, on April 12, 1937, Serial Number 136,473.

It has been found that when cans are thus permitted to drain off their surplus coating, the lowermost ends of the cans will retain a satisfactory coating film, but due to capillary action, or the surface tension of the draining coating material, the film at the upper extremity of the cans will become thin and inadequate, and during the double seaming of such cans faults appear at the inadequately coated ends which will expose bare metal portions to contact with the beer contained in such cans. Thus, in order to build up an adequate protective coating film at the top ends of can bodies I propose to double coat such can ends, and the invention seeks to provide a novel means for coating one open end only of the cans, thereby to avoid the necessity of double coating the whole of the cans.

In its more detailed nature, the invention resides in the provision of a shallow, generally V-shaped coating trough for receiving a limited portion only of can ends disposed with their axes inclined to the vertical, and means for rolling cans along in the trough, said trough being of a length at least slightly exceeding the circumference of the can so as to assure at least one complete rotation of each can in the coating material contained in the trough.

With the above and other objects in view which will more fully appear, the nature of the invention will be more clearly understood by following the description, the appended claims, and the several views illustrated in the accompanying drawings.

In the drawings:

Figure 1 is a side elevation and part vertical cross section of the apparatus.

Figure 2 is a front elevation of the apparatus.

Figure 3 is a vertical cross section taken on the line 3—3 on Figure 2.

Figure 4 is a detail side elevation and part section of a coated can.

In the practical development of the invention I provide a pair of suitably spaced end standards for supporting the can end coating trough. Each end standard includes a base casting 5, uprights or support rods 6, and trough supporting or head castings 7. The head castings 7 are recessed at 8 to receive the trough member 9 which is suitably recessed to provide a V-shaped troughway 10 for receiving the lacquer, enamel or other coating material.

The head castings 7 also include diverging arms 11, disposed at opposite sides of the troughway as shown in Figures 1 and 3. A pair of spaced can supporting tracks 12 are secured upon and extend between the arms at one side of the troughway. Angle pieces 13 are secured to the same arms and serve as supports for the guide bar 14 disposed in position for guiding and confining can ends as they are rolled along over the tracks 12 and in the troughway 10 as shown in Figure 1.

The remaining arm of each casting 7 is equipped with a bearing extension 15, the axis of which bearing is disposed parallel the tracks 12, and in each bearing is mounted a shaft 16 carrying a pulley 17. A belt 18 takes over the pulleys 17 and one flight thereof parallels the tracks 12 and is spaced therefrom a distance equivalent to the diameter of the cans 19 so as to engage the cans as shown in Figure 1 and roll them along the tracks. The ends of the cans are flanged in the usual manner as indicated at 20 and one of the flanges rides the edge of the upper track and serves to hold the opposite end of the can spaced from the opposed wall of the troughway as indicated at 21 in Figure 3. It will be noted also that the guide bar 14 will keep the cans from riding up out of the coating bath.

One head casting 7 also includes a horizontal bearing extension 22 in which a shaft 23 is rotatably mounted. The shaft 23 and the adjacent shaft 16 carry intermeshing bevel gears 24, and a pulley 25 secured upon the shaft 23 is driven by a belt 26 from a pulley 27 carried on a drive shaft 28 to which rotation is imparted through suitable reduction gearing 29 from a motor 30. The motor is supported upon a bracket 31 mounted on certain of the uprights 6. By this means movement is imparted to the belt 26 for the purpose of rolling the cans along in the troughway 10.

A constant level of coating liquid 32 is maintained in the troughway 10, being fed thereto through a pipe line 33 from a reservoir 34 formed in a casting 35 supported upon a suitable standard 36. The reservoir casting affords support, as at 37, for the neck of an inverted bottle 38 positioned to form a liquid seal at the level at which it is desired to maintain the coating in the troughway 10. Suitable additional support for the bottle is provided at 39.

The reservoir and troughway parts are so positioned and proportioned as to maintain a constant level of coating liquid in the troughway. It has been found that a level of from one to three-fourths of an inch will suffice to provide the desired coating band.

In this particular illustration I have disposed the head casting arms and troughway walls in right angular relation, thus disposing the tracks 12 so as to support the cans with their axes tilted at an angle of 45° to the vertical. It is to be understood, however, that the degree of tilt of the cans may be varied, and may be greater or less than that specifically shown.

The cans may be fed to and from the coating trough in any approved manner, as by connection with delivery and receiving end portions 40 and 41 of simple can run trackage as shown in Figure 2.

As the open ends of the cans 19 roll along in the troughway 10, dipping in the coating material 32 therein, said ends will receive a narrow cylindrical band 42 of the coating material around the inside and outside rim of the can as shown in Figures 1 and 4.

This reinforcing band 42 of coating material may be applied either before or after the can bodies have received their total coating as hereinbefore described, and will effectively prevent exposure of bare metal at the can ends due to thinning out of the protective coating by draining or otherwise. This coating may even be duplicated at the respective ends of the can, if desired, but it has been found that it can well be dispensed with at that end of cans which are disposed lowermost during the draining operation incident to total coating.

What I claim is:

1. In apparatus of the character described, a trough member having diverging walls forming a V-shaped troughway therein, coating material in the troughway, a can support laterally aligned with one wall of the V-shaped troughway and adapted to support a can with one side of one end immersed in the coating material, means for holding the can out of contact with the walls of the troughway, and means for rotating the can on said support to form a cylindrical band of coating at the immersed end thereof.

2. In apparatus of the character described, a trough member having diverging walls forming a V-shaped troughway therein, coating material in the troughway, trackage paralleling the troughway and forming an extension from one wall thereof to support a plurality of end flanged can bodies with one side of one end of each can immersed in the coating material and with the flanges at the other ends of the cans engaging the trackage in a manner for holding the immersed can body ends out of contact with the trackway walls, said troughway being of a length in excess of the circumference of a can, and an endless belt paralleling the trackage and having a flight thereof engageable with cans on the trackage for rolling them along to provide a cylindrical coating at the immersed ends of the cans and for maintaining the flange and trackage engagement.

ALFRED L. KRONQUEST.